Figure 1:
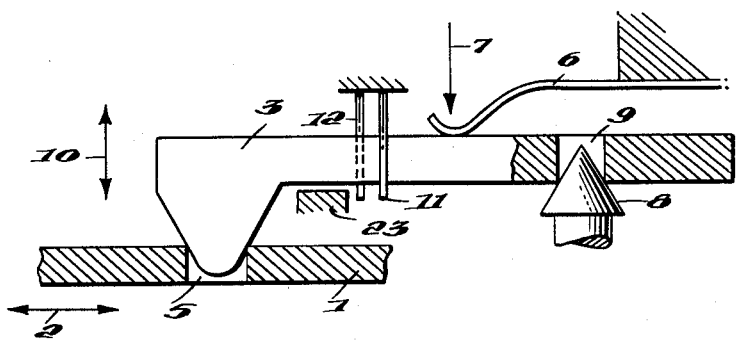

Oct. 16, 1962     E. GERLACH     3,058,637

FILM PROJECTOR REGISTER ARRANGEMENT

Filed Sept. 15, 1959

INVENTOR
ERWIN GERLACH,

BY Larson and Taylor

ATTORNEYS

United States Patent Office 3,058,637
Patented Oct. 16, 1962

3,058,637
FILM PROJECTOR REGISTER ARRANGEMENT
Erwin Gerlach, Fornudden, Trollbacken, Sweden, assignor to Svenska Aktiebolaget Gasaccumulator, Lidingo, Sweden, a corporation of Sweden
Filed Sept. 15, 1959, Ser. No. 840,058
Claims priority, application Sweden Sept. 19, 1958
3 Claims. (Cl. 226—58)

The invention relates to film projectors of the intermittent motion type, and, more particularly, to an arrangement for improving the film register of such projectors.

In ordinary motion picture projectors, the film is moved intermittently past the gate by means of a film feed device, which may comprise a Maltese cross or a reciprocating claw cooperating with the perforations of the film. It is important for avoiding eye fatigue in the viewer that the projector should project the pictures with sufficient steadiness, so that successive pictures appear in accurate register, i.e. that corresponding portions of successive pictures coincide when projected on the screen.

If the demand for picture steadiness is not very high, the control of the film which is obtained in a film feed device of normal precision is adequate. If, however, a higher degree of steadiness is required, some sort of register control device has to be provided for fixing the position of the individual picture frames relative to the film gate. This is connected with special difficulties in projectors in which the film can be fed during the projecting process either forward or backward. In this type of a projector, it is not possible to obtain satisfactory fixation of the picture frames relative to the film gate by means of the film feed device alone by relying on the friction in the film holder, since the resilience and the play present in the film feed device will exert its influence either in one direction or the other in such a way that the positioning of the picture will be different during forward and during backward feed.

The object of the invention is to remove this lack of steadiness or accurate film register in a film projector of the intermittent motion type. To this end, the arrangement according to the invention comprises a register control device carrying a wedge and adapted, when a film picture has been fed into position in the film gate, to engage said wedge in the film perforations, thereby to control the position of the film relative to said gate.

Further objects of the invention as well as the advantages thereof will be apparent from the following description of two embodiments thereof shown on the attached drawing. In the drawing.

Figure 2:
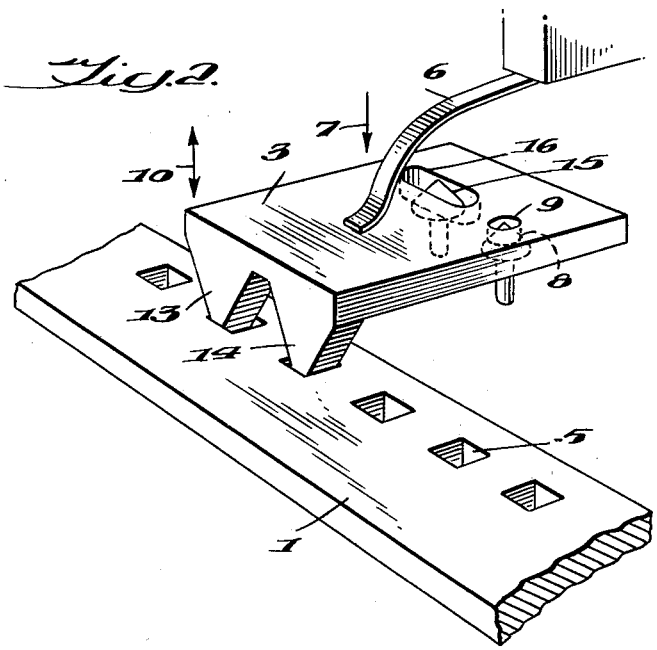

FIG. 1 shows an embodiment, the wedge of which engages a single performation of the film and, FIG. 2 an embodiment in which the wedge engages a pair of separate perforations of the film.

In the drawing, like reference numbers refer to similar details in the two figures. There are illustrated only those parts of a film projector necessary for understanding the invention, it being understood that the projector may otherwise be of known construction well known in the art.

In the drawing, 1 designates the film, which may be transported by a film feed device either forward or backward as indicated by a two way arrow 2. When the transportation of a picture frame has been concluded, the frame is fixed relative to a film gate not illustrated on the drawing by means of a register control device 3 carrying a pin 4, which is adapted to engage the perforations 5 of the film. A spring 6 operates in the direction indicated by the arrow 7 to hold the register control device 3 continually with pressure against the film 1. In order to insure that the register control device will under all conditions hold the perforations in exactly the same position relative to the film gate, a mounting has been provided, which comprises a conical pin or point 8 engaging an aperture 9 in the register control device 3. The control device 3 is hereby reciprocable upwardly and downwardly relative to the film in the manner indicated by the two way arrow 10. The spring 6 is positioned so as to retain the control member in position on the conical point 8 at the same time as it provides for the necessary pressure against the film. A preferred position for the spring 6 is at a point somewhat nearer to the point 8 than to the pin 4.

As was pointed out above it is essential that the register control member should not be displaceable in the direction of the film when performing its reciprocating movement. On the other hand, the requirements on the control of the movement of the control member in the transverse direction relative to the film are not so stringent, so that this control may be provided, for instance, by means of a pair of pins 11 and 12 placed laterally of the control member so as to limit the movements thereof. Preferably, there is also provided a fixed support 23 limiting a movement of the register control member in a counter clockwise direction when there is no film in the projector.

In the description of the FIG. 1 embodiment of the invention, it has been assumed that the register control member 3 possesses only one pin 4. Such an embodiment is suitable in case the film is provided with perforations at only one border thereof. However, if the film has double perforations, i.e. along both its borders, it is still possible to use an embodiment according to FIG. 1, but in this case it is preferable to provide two pins 4, each of which engages a separate perforation on each side of the film. The register control member 3 will then extend across practically the whole width of the film so that a second mounting point corresponding to the point 8 can be provided. This will make the additional control through the pins 11 and 12 superfluous.

In the FIG. 2 embodiment, the register control member is provided with two pins 13 and 14 placed at a certain distance from each other so as to cooperate each with one of a pair of perforations along the same edge of the film. The control member 3, as before, is subject to the action of a spring 6 in the direction of the arrow 7. The control member 3 is carried, as before, by the pin 8 and, additionally, by a similar pin 15 engaging an aperture 16. In order for the pin 8 to be solely responsible for controlling the position of the control member relative to the direction of the film feed, the aperture 16 cooperating with the pin 15 is of elongated shape.

The mutual spacing of the pins 13 and 14 and the shape thereof is selected in view of the spacing and dimension of the film perforations so as to make only the external or outwardly turned sides of the pins abut the edges of the perforations. The sides of the pins facing each other therefore clear the edges of the perforations and are without influence on the position of the film relative to the film gate. As is apparent from the drawing, the sides referred to as engaging the perforation edges are inclined so as to make the pair of pins 13 and 14 equivalent to portions of a single conical pin, the portions having been separated so as to engage separate perforations. In this manner accurate and positive control of the film movement is obtained.

The movement of the register control member 3 in a direction normal to the film is not subject to any other control than that exerted by the film perforations owing to the slight pressure from the spring 6 causing the control member to press against the film. Owing to the pressure of the spring 6 against the control member 3, the latter serves simultaneously for holding the film against a support which has not been illustrated on the drawing, and contributes in this manner to holding the film flat in the film gate.

The force exerted by the spring 6 can easily be adjusted so as to make the control member cooperate reliably with the perforation at the same time as any wear on the film and its perforations is avoided.

The invention has been described in the foregoing description as applied to a projector, but it is obvious that the same advantages are obtained in applying the invention to a camera or similar taking equipment.

What is claimed is:

1. In a film projector having a film gate through which a perforated film strip is moved intermittently, a register-control device comprising an arm having at least one wedge shaped pin, said wedge shaped pin having two opposed surfaces inclined to the plane of the film strip and in the direction of travel of the film strip, means for pivotably mounting said arm so that said wedge shaped pin is specifically disposed relative to the film gate and adapted to engage the perforations of the film strip, said mounting means limiting the direction of movement of said arm and wedge shaped pin to that direction perpendicular to the surface of the film, and spring means adapted to continuously urge said wedge shaped pin against the film surface, whereby said wedge shaped pin is adapted to engage the film perforations thereby locating the film frames relative to the film gate.

2. A register control device as claimed in claim 1 in which the said mounting means consists of two pin disposed so as to prevent movement of said arm in the direction of the film strip movement in conjunction with a conical point engaging a circular aperture in said arm, and in which said spring means consists of a single spring which urges said arm against said conical point.

3. A register control device as claimed in claim 1 in which the mounting means consists of a pair of conical points in conjunction with a pair of apertures in said arm, one of said apertures being a circular aperture and the other being an aperture elongated in the direction of film movement, and in which said spring means consists of a single spring which urges said arm against said conical points.

References Cited in the file of this patent
UNITED STATES PATENTS 1,984,143    Kraft    Dec. 11, 1934